(12) United States Patent
Hosono et al.

(10) Patent No.: US 6,946,780 B2
(45) Date of Patent: Sep. 20, 2005

(54) CARBON BODY, PROCESS FOR PRODUCING THE CARBON BODY, AND ELECTRIC FIELD EMISSION ELECTRON SOURCE USING THE CARBON BODY

(75) Inventors: Akihiko Hosono, Tokyo (JP); Shuhei Nakata, Tokyo (JP); Masaaki Hiraki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,976

(22) Filed: Jun. 4, 2001

(65) Prior Publication Data

US 2002/0053864 A1 May 9, 2002

(30) Foreign Application Priority Data

Nov. 6, 2000 (JP) ........................................ 2000-337203

(51) Int. Cl.⁷ .................................................. H01J 1/02
(52) U.S. Cl. ...................... 313/310; 313/309; 313/311; 313/351
(58) Field of Search ................................. 313/308, 309, 313/310, 311, 336, 351, 495; 428/367

(56) References Cited

U.S. PATENT DOCUMENTS 6,097,138 A * 8/2000 Nakamoto ................. 313/309
6,100,628 A   8/2000 Coll et al.
6,143,412 A * 11/2000 Schueller et al. ............ 428/408
6,181,055 B1 * 1/2001 Patterson et al. ........... 313/309
6,312,303 B1 * 11/2001 Yaniv et al. .................. 445/24
6,322,713 B1 * 11/2001 Choi et al. ..................... 216/38
6,340,822 B1 * 1/2002 Brown et al. .................. 257/25
6,403,209 B1 * 6/2002 Barton et al. ............. 428/307.7
6,504,292 B1 * 1/2003 Choi et al. ................... 313/310
6,538,367 B1 * 3/2003 Choi et al. ................... 313/309
6,720,728 B2 * 4/2004 Den et al. .................... 313/495

FOREIGN PATENT DOCUMENTS

| JP | 2000-57934 | 2/2000 |
| JP | 2000-156148 | 6/2000 |
| KR | 00261541 | 4/2000 |

* cited by examiner

*Primary Examiner*—Amir Zarabian
*Assistant Examiner*—Thanh Y. Tran
(74) *Attorney, Agent, or Firm*—Leydig, Voit & Mayer, Ltd.

(57) ABSTRACT

A carbon body has a structure for producing a planar electron source in a simple manner; a process for producing the carbon body; and an electric field emission electron source using the carbon body. The carbon body is a thin layer having a front surface and a back surface, and at least the front surface is a continuous curved wall, as viewed in plan, having a netlike structure.

18 Claims, 13 Drawing Sheets

US 6,946,780 B2

CARBON BODY, PROCESS FOR PRODUCING THE CARBON BODY, AND ELECTRIC FIELD EMISSION ELECTRON SOURCE USING THE CARBON BODY

BACKGROUND OF THE INVENTION

1. Field of the Invention

The present invention relates to a carbon thin body having a unique structure, a process for producing the same, and an electric field emission type electron source using the same; and in particular to a carbon thin body which is expected to be used as an electron generating source in a display device, a process for producing the same, and an electric field emission type electron source using the same.

2. Description of the Background Art

Hitherto, as a unique structure of a carbon thin body, for example, carbon nanotubes have been known. As shown in FIG. 25, the carbon nanotubes are made in the form that carbon tubes 113 whose tips are closed are perpendicularly extended from a substrate 102. At the beginning when the carbon nanotubes were discovered, the carbon nanotubes were not formed for a particular purpose and no method of using the nanotubes was ascertained. However, by arranging the nanotubes in a planar form, it has become possible to obtain a compact and high-performance planar electric field emission type electron source. As, in the planar electric field emission type electron source, its tip portions are sharper, a more intense electric field for pulling electrons to the vicinity of the tip portions is easily built. As an index representing the efficiency of electron-emission for the electric field, an electric field amplification factor is used. It is also necessary to heighten the density of the sharp tips which are electron emitting points. The emission current, which is an index of performance of an electric field emission type electron source, is in proportion to the product of the electric field amplification factor, the density of the electron emitting points and the area of the electron source. The emission current can be precisely evaluated by simulation using the diameter W of carbon nanotubes and the interval d between the carbon nanotubes in a model of perpendicularly-oriented carbon nanotubes, as shown in FIG. 26.

The use of the carbon body made of the carbon nanotubes as a planar electron source has been expanded. Because of its unique structure, however, it has been considered that the carbon nanotube has no known use.

However, (a) carbon nanotubes are not formed unless the temperature of the substrate for them is raised to a given temperature or higher; (b) an expensive catalyst is required for forming nanotubes; (c) carbon nanotubes have small adhesion to the substrate owing to their structure; and (d) in the case that carbon nanotubes are used as a planar electron source, it is necessary to use a conductive substrate, or form the carbon nanotubes after a conductive film is formed on a nonconductive substrate since the respective nanotubes are electrically independent of each other. As shown in FIG. 27, in order to supply an electric current or voltage to perpendicularly-oriented carbon nanotubes 113 when the substrate 102 is insulating, it is necessary to deposit a conductive film 105 on the substrate 102 and then form the perpendicularly-oriented carbon nanotubes thereon. The electric current or voltage is supplied from an electric current source or a voltage source to the conductive 105.

In the case that carbon nanotubes are used as a planar electron source, an inexpensive glass substrate cannot be used because of the substrate temperature referred to in item (a). This hinders the use of carbon nanotubes, which are originally expensive The drawbacks referred to in items (b) and (d), together with the drawback referred to in item (a), cause an increase in costs for making carbon nanotubes for a planar electron source.

SUMMARY OF THE INVENTION

A first object of the present invention is to provide a carbon thin body having a structure making it possible to produce a planar electron source in a simple manner, a process for producing the carbon thin body, and an electric field emission type electron sources using the carbon thin body.

A second object of the present invention is to provide a carbon thin body that has a unique structure and that can be supplied for the above-mentioned use and be used for unknown fields, and a process for producing the same.

The carbon thin body of the present invention has a given thickness and is in the form of a thin layer having a front surface and a back surface, wherein at least in its front surface portion a curved wall is continuous, as is viewed in plan, to have an approximately netlike structure.

At least in the front surface portion of the carbon thin body, its curved wall makes an approximately netlike structure. Therefore, its electric field amplification factor may be poorer than that of perpendicularly-oriented carbon nanotubes, but the density of electron emitting points is higher. Thus, from the whole of the electron source, larger emission electrons can be obtained than perpendicularly-oriented carbon nanotubes. Since the approximately netlike structure is made by the continuous curved wall, respective portions of the carbon thin body conduct electrically. Accordingly, it is unnecessary to cause the respective portions of the carbon thin body to conduct electrically by forming a conductive film or using a conductive substrate as carried out in the case that perpendicularly-oriented carbon nanotubes are used as an electron source. As a result, an inexpensive electric field emission type electron source can be simply produced. The approximately netlike structure includes a netlike structure having a wall portion extending, as an end portion and without being connected to other portions, into this structure. In other words, the approximately netlike structure may not have a wall portion extending, as an end portion, into the structure, or may have a wall portion extending, as an end portion, into the structure.

The structure of the carbon thin body has been not found out so far. Because of its unique structure, the carbon thin body can be expected to be used in unknown fields other than the electric field emission type electron source.

In the carbon thin body, the curved wall is preferably arranged to approximately surround given openings in a curved form, as is viewed in plan, and substantially constitute peripheral portions of the openings.

In a carbon nanotube, its one end becomes narrow and is closed. On the other hand, in the carbon thin body of the invention, its curved wall approximately surrounds the given openings. For this reason, the density, per unit area, of the tip portions of the wall at the front surface portion is high. In the case that the carbon thin body is used as an electric field emission type electron source, emission currents can be made large. The carbon thin body can be expected to be used as a filter or the like by causing a fluid to flow in the carbon thin body along its thickness direction. By making the diameter of the openings small, mixed gas of large gas molecules and small gas molecules may be separated into gas of the large gas molecules and gas of the small gas molecules. The wording "approximately surround the openings" means that some openings are completely surrounded by the curved wall and the other openings are not completely surrounded to be opened.

The carbon thin body of the invention is positioned on a surface of an object. The back surface of the carbon thin body contacts the surface of the object, and the curved wall stands up in a standing-wall form from the surface of the object.

According to this structure, the carbon thin body can be formed, contacting the surface of the object. Therefore, in the case that the carbon thin body is used, for example, as an electric field emission type electron source, the carbon thin body can be formed directly on members constituting the electron source. In this case, the carbon thin body is formed, contacting the object surface in such a manner that a curved wall stands up on the surface. Thus, the carbon thin body is not formed in a point-contact state as in perpendicularly-oriented carbon nanotubes. For this reason, in the carbon thin body of the invention its adhesiveness onto the object surface can be made higher than in perpendicularly-oriented carbon nanotubes. The surface of the object may be plane or curved. The object may be any one of various substrates.

In the carbon thin body of the invention, a base that occupies back surface side within the carbon thin body may be formed in a continuous film form to be embedded in the openings.

The carbon thin body of the invention includes the above-mentioned carbon thin body wherein its base has no opening and carbon is embedded in the bottom portion of the approximately netlike structure. In the carbon thin body having this structure, the strength thereof is improved and the electrical conductivity in the plane thereof is also improved.

In the carbon thin body of the invention, it is preferable that the curved wall has a hexagonal system crystal structure and the bottom plane of the hexagonal system crystal is arranged in parallel to the direction that crosses the front surface of the carbon thin body.

Carbon having a hexagonal crystal structure is graphite. In the above-mentioned structure, the bottom surface of the hexagonal system crystal is arranged in parallel to the curved wall. In graphite, carbon atoms are connected to each other by covalent bonding so that the atoms are arranged in a net form. Such nets are bonded to each other by van der Waals force to be laminated. These netlike planes are arranged in parallel to the bottom surface of the hexagonal system crystal. The van der Waals force is relatively weak, so that the interval between the bottom surfaces is wide. Thus, electricity or heat is easily conducted inside the respective nets, and strength is easily separated between the respective nets.

In the crystal configuration of the above-mentioned carbon thin body, it is easy that the thin body is mechanically separated into a plurality of areas, as is viewed in plan. Therefore, the thin body having a large area can easily be separated into the thin bodies having a small area. In the carbon thin body, its electric conductivity is high inside the wall plane. Therefore, in the case that the thin body is used as an electric field emission type electron source, electrons can easily be supplied from its cathode pulling-out electrode to the tip of the surface of the thin body. When the cathode pulling-out electrode is connected to a part of the carbon thin body, electrons can be supplied to the entire surface of the thin body.

In the carbon thin body of the invention, it is preferable that the curved wall has an average thickness of 100 nm or less.

If the average thickness of the curved wall is over 100 nm, the electric field amplification factor is lowered in the case that the carbon thin body is used as an electric field emission type electron source. The density of electron emitting points is also lowered. As a result, the emission current is lowered. If the average thickness is 50 nm or less, the electric field amplification factor increases and the density of the electron emitting points is sufficiently high. Thus, the thickness is more preferably set to 50 nm or less.

In the carbon thin body of the invention, it is preferable that its two points that are arbitrarily selected conduct electrically.

In this structure, the carbon thin body can be handled as a conductor. Thus, in the case that the carbon thin body is used as an electric field emission type electron source, its cathode pulling-out electrode can be made small-sized. It is therefore possible to suppress the shield of the electric field that the backside pulling-out electrode in the electron source generates. As a result, the emission density of electrons can be made uniform in the entire surface of the thin body.

In the carbon thin body of the invention, the surface of the object may be a surface of a glass substrate.

By arranging the carbon thin body on the glass substrate, the area of the thin body can be inexpensively made large. Thus, it is possible to use the carbon thin body in a display device of a portable terminal such as a portable phone, a television, a personal computer or the like.

The process for producing a carbon thin body of the invention includes the step of using plasma which is generated from gas containing a carbon compound and which a magnetic field and an electromagnetic wave is applied to, so as to form the carbon thin body on a surface of an object by chemical vapor growth. In this process, the magnetic field and the electromagnetic wave substantially satisfy a resonance condition for electrons in the plasma.

In this process, electrons absorb energy from the electromagnetic wave, and then an energy discharging process (relief process) is repeated while the electrons move spirally around the magnetic field. The electrons also give kinetic energy to carbon ions. While the carbon ions to which the kinetic energy is given move spirally around the magnetic filed, the carbon ions are introduced onto the surface of the object. If the axis of the spiral electron movement is along the direction crossing the object surface, the component of the momentum of the electron perpendicular to the object surface is small. It is therefore possible to avoid damage of the object surface based on collision of the electrons with the object surface. For this reason, in the state that the object surface is appropriately excited, the carbon ions to which appropriate kinetic energy is given are adsorbed onto the surface and move appropriately. As a result, graphite grows in such a manner that the bottom surface of its hexagonal system crystal stands up on the object surface. In other words, covalent bonds are not formed along the object surface but are formed along the direction crossing the object surface.

In the case that the above-mentioned resonance condition for electrons is not satisfied, diamond like carbon (DLC) or a diamond thin layer is formed on the object surface. Namely, carbons bonded by covalent bonding are formed along the object surface.

According to the carbon thin body producing process of the invention, the time from the center of the magnetic field to the object surface or the distance from the center of the magnetic field to the object surface is important. During this time, the energy that electrons absorb from the electromagnetic wave is appropriately given to carbon ions through the relief process. Therefore, in the carbon thin body producing process of the invention, the following conditions, besides the above-mentioned resonance condition for electrons, are important factors: (a) the distance from the center of the magnetic field to the object surface; (b) object (substrate) temperature; (c) object (substrate) bias voltage; (d) the blend ratio between the carbon-containing compound and hydrogen gas, which are reaction gases; and so on.

The above-mentioned resonance condition for electrons can be represented by the following equation, which is a resonance condition equation of cyclotron movement of electrons:

$\omega = (e \cdot B)/m_e$ wherein $\omega$ is the frequency of the electromagnetic wave, B is the magnetic flux density of the magnetic field, e is the electric charge of an electron, and $m_e$ is the mass of the electron. However, the magnetic flux density of the magnetic field is locally uneven. Therefore, even if the frequency of the above-mentioned electromagnetic wave is shifted, the resonance condition for electrons is satisfied at some position. Thus, the above-mentioned carbon thin body of the present invention can be formed. For this reason, if the resonance condition for electrons is satisfied in some position in plasma, the process under this condition comes under the present invention.

In the above-mentioned carbon thin body producing process of the invention, it is preferable that the direction of the magnetic field and the direction along which the electromagnetic wave advances are in parallel to each other and cross the surface of the object.

According to this process, the carbon atoms (ions) having a momentum with appropriate direction and intensity are adsorbed onto the object surface to make it possible to deposit graphite having the above-mentioned orientation and form the approximately netlike wall structure.

In the above-mentioned carbon thin body producing process of the invention, it is preferable that as the electromagnetic wave, a microwave is used.

In the resonance condition for electrons, the frequency of the electromagnetic wave and the intensity of the magnetic field are proportional to each other. In other words, as the frequency of the electromagnetic wave is made higher, in order to satisfy the resonance condition it is necessary to make the intensity of the magnetic field higher. The intensity of the magnetic field necessary for resonating electrons about the frequency of the microwave is greatly high, which is evidently different from magnetic fields based on other devices. This magnetic field is however a magnetic field that can be generated by an ordinary electromagnet or permanent magnet. Therefore, a device for producing the above-mentioned carbon thin body can be made inexpensive and small-sized. The microwave is an electromagnetic wave having a wavelength of $5 \times 10^{-1}$ m to $1 \times 10^{-4}$ m. Handling of the microwave, such as introduction of the microwave, can easily be carried out using well-known members such as a wave guide.

In the above-mentioned carbon thin body producing process of the invention, it is preferable that ingredient gases for generating the plasma include a carbon-containing compound and hydrogen gas, and the ratio of the hydrogen gas in the ingredient gases ranges from 25% to 75%.

The carbon-containing compound may be made into a plasma state by the microwave and the magnetic field or by discharge of electricity. In this plasma, carbon is present in the form of a carbon ion or a carbon-containing molecule ion. Giving and taking of electrons are carried out in the vicinity of the object surface so that graphite comes to be formed. Even if hydrogen is taken into graphite, hydrogen is easily emitted. Hydrogen is also bonded to other impurities such as oxygen and discharged. Therefore, hydrogen has a reducing effect to protect graphite. For this reason, using the carbon-containing compound and hydrogen having ordinary purity, graphite having high purity and good crystallinity can be formed. If the ratio of the hydrogen gas is below 25%, the carbon thin body having an approximately netlike wall structure cannot be formed. If the ratio of the hydrogen gas is over 75%, carbon is not adsorbed on the substrate and a carbon film in any form cannot be formed. In order to obtain the carbon thin body of the invention stably, the ratio of hydrogen is more preferably from 35% to 65%.

In the above-mentioned carbon thin body producing process of the invention, a surface of a glass substrate can be used as the surface of the object.

According to the above-mentioned thin body producing process, the carbon thin body is usually formed on a heated substrate. Even if the temperature for heating the substrate is lowered in this process, given graphite can be formed. Accordingly, the temperature for heating the substrate can be made lower than in conventional processes. Thus, by heating the object surface that cannot resist heating treatment within the temperature range of more than 700° C. to about 800° C. at about 700° C. or less, desired graphite can be formed on the object surface. As a result, by using an inexpensive substrate as the object surface, the area of the carbon thin body can be inexpensively made large. Using the glass substrate, the heating temperature may be made lower, for example, 600° C. or less. In this case, it is necessary to control the distance from the center of the magnetic field to the substrate within a given range. If the substrate is heated at 600° C. or less so that desired graphite can be formed, it is possible to use an inexpensive glass substrate for wise use. Consequently, it is possible to make the area of the carbon thin body large inexpensively and supply an electric field emission type electron source for a large-screen display device.

In the electric field emission type electron source of the invention, a carbon thin body in which a curved wall is continuous at least in its front surface portion to have an approximately netlike structure is used as an electron emitting member for emitting electrons forward.

In any electric field emission type electron source, an electric field is generated to emit electrons ahead of the electron source. Electrons are pulled out by this electric field and emitted ahead from the surface of the electron source. As the surface shape of the electron source is sharper, larger electrons are emitted with higher efficiency. The electric field emission type electron source of the invention has a structure wherein its curved wall is continuous to be approximately netlike. Thus, electrons can be efficiently emitted from the tip of the wall. This approximately netlike wall is uniformly formed over the entire surface of the electron source, and further all sites of the above-mentioned carbon thin body conduct electrically. For this reason, by supplying an electric current into one site of the above-mentioned electric field emission type electron source to make its voltage into a given value, all sites of the carbon thin body can be set to the same voltage. As a result, in the case that the electron source of the invention is used as an electric field emission type electron source for a display device, uniform display can be inexpensively attained, without forming a new conductive layer or using a conductive substrate, by the compact structure.

In the above-mentioned electric field emission type electron source of the invention, it is preferable that the diameter of openings surrounded by the wall in the approximately netlike structure is larger than the height of the wall.

If the diameter of the openings is smaller than the height of the wall (thickness of the carbon thin body), it is impossible to apply an electric field suitable for extracting electrons to the tip of the wall. By making the interval between the wall portions large as described above, electrons are easily pulled out from the tip of the wall. Thus, the carbon thin body can be effectively used as an electric field emission type electron source. The wording "the diameter of the openings" means the average diameter of the openings observed when the approximately netlike structure is viewed in plan.

The above-mentioned electric field emission type electron source of the invention includes a cathode pulling-out electrode for supplying electrons to the carbon thin body, and a extraction electrode for generating an electric field for emitting the electrons from the carbon thin body. In this electron source, the carbon thin body is positioned ahead of the cathode pulling-out electrode, contacting the upper of the cathode pulling-out electrode, and the extraction electrode is positioned ahead of the carbon thin body in the manner that the extraction electrode does not overlap with the carbon thin body, as is viewed in plan.

By arranging the extraction electrode outside and around the periphery of the carbon thin body and ahead thereof, as described above, an electric field for extracting electrons to the front surface portion of the carbon thin body is generated. The extraction electrode does not hinder forward movement of the extracted electrons. In the above-mentioned front surface portion of the carbon thin body, its curved wall is arranged to be complicated into an approximately netlike structure. As a result, it is possible to heighten the electric field amplification factor, which is an index representing the electron emitting efficiency for the above-mentioned electric field, and obtain many emitted electrons by a weak electric field.

The electric field emission type electron source of the invention includes a cathode pulling-out electrodes for supplying electrons to the carbon thin body, and a backside extraction electrode, positioned in the rear of the carbon thin body, for generating, from the rear, an electric field for emitting the electrons from the carbon thin body. In this electron source, the cathode pulling-out electrode is positioned ahead of the backside extraction electrode, and the carbon thin body is positioned ahead of the cathode pulling-out electrode, contacting the upper of the cathode pullingout electrode.

By setting up the backside extraction electrode arranged in the rear of the carbon thin body as described above, the extraction electric field is formed over the area from the backside to the front. Therefore, the extent that the extraction electric field is limited into the periphery of the carbon thin body is relieved, so that the electric field is applied to the center of the carbon thin body, too. This tendency becomes clearer as the size of the carbon thin body becomes smaller. The position where electrons are emitted is not limited into the periphery of the carbon thin body, as is compared with the case that the extraction electrode is arranged outside the carbon thin body and ahead thereof. For this reason, it is possible to obtain screen-brightness that is relatively superior in uniformity.

In the above-mentioned electric field emission type electron source of the invention, the cathode pulling-out electrode is arranged only in the periphery of the carbon thin body.

Since the cathode pulling-out electrode is conductive, the electrode shields the electric field generated by the backside extraction electrode arranged behind the cathode pulling-out electrode. Therefore, the above-mentioned electric field is caused to go around the periphery of the cathode pulling-out electrode from behind and be pulled out onto the front surface. In this case, the electric field in the periphery of the carbon thin body becomes large and that in the center thereof becomes weak. If a given voltage is applied to a part of the carbon thin body, the same voltage is generated in the whole of the carbon thin body as described above. Therefore, the cathode pulling-out electrode can be located only in the periphery of the carbon thin body. Thus, it is possible that the electric field generated by the backside extraction electrode, at the area except the periphery, is not shielded by the cathode pulling-out electrode. As a result, electron emission from the carbon thin body is made uniform over the whole of the carbon thin body. In the case that a continuous film is formed in the base of the above-mentioned carbon thin body, the extraction electric field is shielded by this continuous film. It is therefore desired that the carbon thin body has no continuous film. Furthermore, it is desired that the diameter of the openings surrounded by the wall in the approximately netlike structure is larger than the height of the wall, as described above.

In the electric field emission type electron source of the invention, the cathode pulling-out electrode is preferably positioned outside the backside extraction electrode not to overlap with the backside extraction electrode as is viewed in plan.

According to this structure, the backside extraction electrode and the cathode pulling-out electrode do not overlap with each other, as is viewed along the direction crossing the carbon thin body. It is therefore possible to form directly an electric field for extracting electrons to the front surface side of the carbon thin body. For this reason, it is possible to make voltage uniform over the entire surface of the carbon thin body without local shielding by the cathode electrode. If in the carbon thin body of this structure a continuous film is formed in the base thereof, an electric field for extracting electrons is shield in the same way. It is therefore desired that the carbon thin body has no continuous film. It is also desired that the diameter of the openings surrounded by the wall in the approximately netlike structure is larger than the height of the wall The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
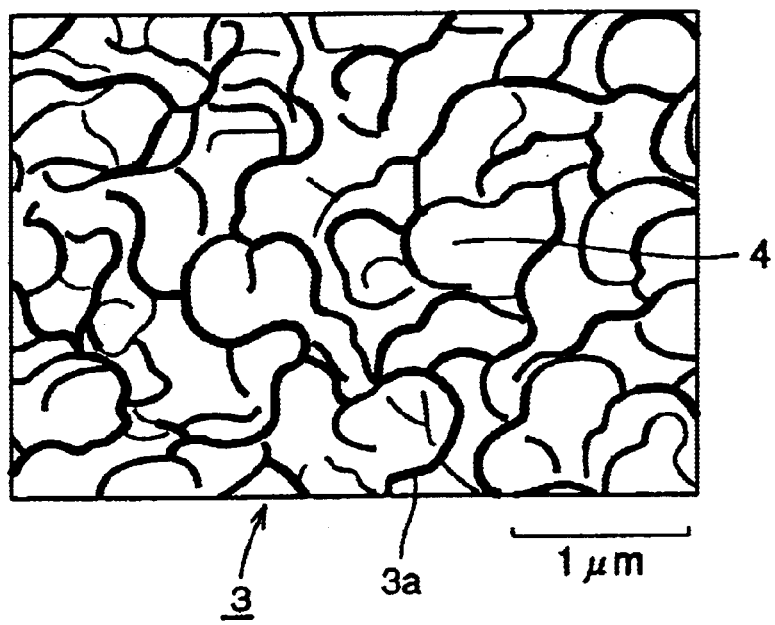
FIG. 1 is a view of the front surface of a carbon thin body composed of an approximately netlike wall, which is observed with a scanning electron microscope (SEM) [20000× magnification]

Referring to the drawings, embodiments of the present invention will be described.

[First Embodiment: Carbon Thin Body]

Referring to FIG. 1, which is based on observation with a 20000-magnification scanning electron microscope (SEM), each of curved walls 3a is formed to surround an opening (aperture) 4 substantially in the front surface of a carbon thin body 9. Some openings 4 are perfectly surrounded by the curved walls. The other openings 4 have partially-opened walls and are not perfectly surrounded.

Figure 2:
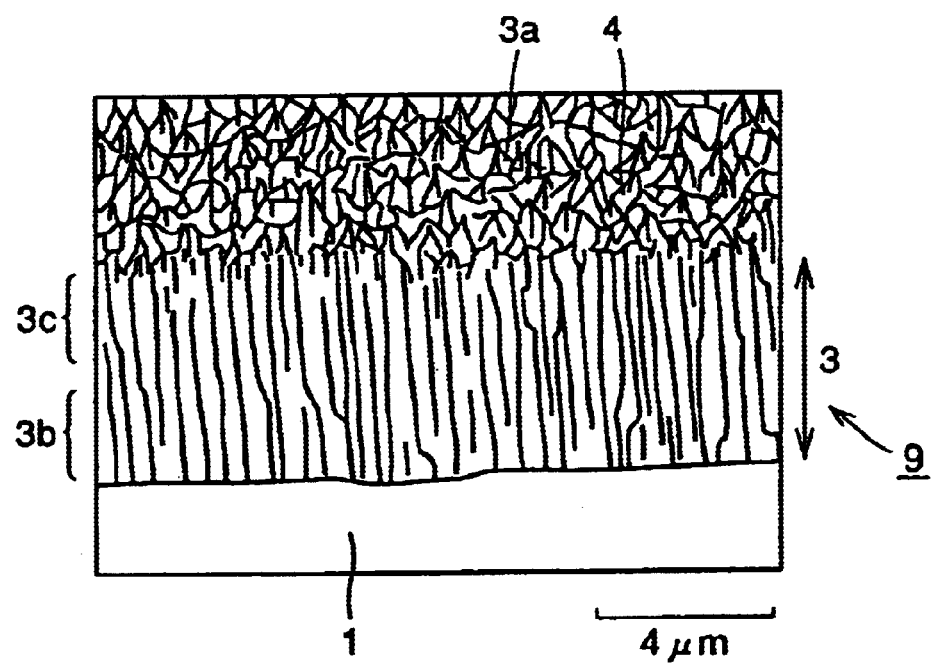
FIG. 2 is a perspective view of a cross section along the direction in which the carbon thin body shown in FIG. 1 grows, and the front surface side of the body, which are observed with a scanning electron microscope (SEM) [5000× magnification]

FIG. 2 is a schematic view of a 5000-magnification SEM image obtained by observing a section along the direction in which the carbon thin body grows and the front surface side of the body, from their oblique upper side. An approximately netlike wall 3 grows from a substrate 1 in parallel to the direction crossing the surface of the substrate 1 with base 3b on the substrate 1, so that the wall 3 has a thickness t. A large difference between the form of the base 3b and that of a front side portion 3c is not observed, but it appears that the density of the approximately netlike wall in the base 3b is larger than that in the front surface portion 3c. However, this difference is not clearly observed. Openings (apertures) 4 approximately surrounded by the approximately netlike wall 3 are observed at the side of the front surface portion 3c. It is not clear that the openings 4 reach the substrate through the base 3b.

The approximately netlike wall grows along the direction crossing the surface of the substrate. It has been verified by transmission electron microscopic (TEM) observation and measurement of Raman scattering that carbon atoms constituting a carbon thin body 9 have a hexagonal system crystal structure in the same way as graphite. It has also been verified that the hexagonal system crystal is arranged in the manner that its c axis direction is substantially in parallel to the surface of the substrate.

Figure 3:
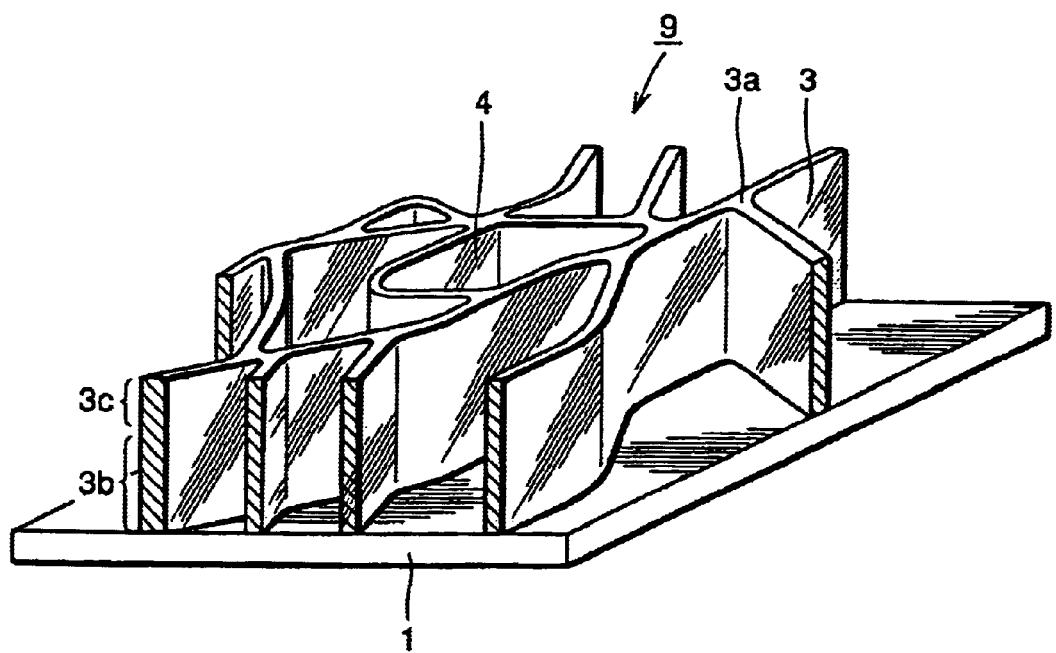
FIG. 3 is a schematic perspective view of the carbon thin body composed of an approximately netlike wall.

FIG. 3 is a schematic perspective view of the carbon thin body 9 shown in FIGS. 1 and 2. In the carbon thin body 9 composed of an approximately netlike wall, the greater part of the base 3b contacting the substrate 1 is curved, which is different from point-contact of perpendicularly-oriented carbon nanotubes. Therefore, the area of the contact becomes far larger than that in the case of simple linear-contact. The adhesive strength becomes far higher than the point-contact carbon nanotubes. In the case that the carbon thin body is used as an electric field emission type electron source, its electric field amplification factor gets higher as the thickness of the front tip of the approximately netlike wall becomes thinner, which is like a sharp blade edge. Since the tip portion 3a of the approximately netlike wall is complicated into an approximately netlike form and is curved, the density of its electron emitting points is far higher than that of perpendicularly-oriented carbon nanotubes.

Figure 4:
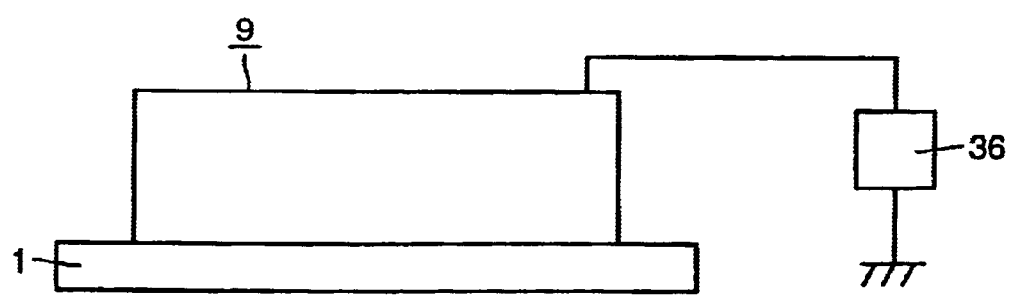
FIG. 4 is a view illustrating a method of supplying an electric current and voltage to a carbon thin body composed of an approximately netlike wall.
Figure 27:
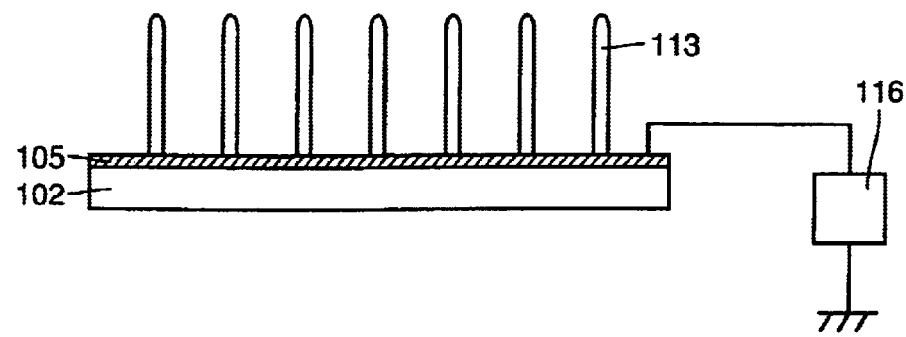
FIG. 27 is a schematic sectional view showing methods for supplying an electric current and a voltage to the perpendicularly-oriented carbon nanotubes.

In the case that conventional perpendicularly-oriented carbon nanotubes are used a planar electronic device, the respective carbon nanotubes are formed independently of each other. To supply a voltage or an electric current to all of the carbon nanotubes, it is necessary that a conductive substrate is used or a conductive thin layer is formed on an insulated substrate as shown in FIG. 27. However, in the case that the carbon thin body of the first embodiment of the present invention is used as shown in FIG. 4, even if the carbon thin body is formed on an insulated substrate 1, an electric current or a voltage can be supplied to the whole of the carbon thin body by supplying the current or the voltage from an electric current or voltage source 36. This is because respective portions of the carbon thin body are connected to each other through the curved walls.

[Second Embodiment: Production of a Carbon Thin Body]

In the process for producing a carbon thin body according to the second embodiment of the present invention, the carbon thin body is produced by plasma CVD method, and preferably by electron cyclotron resonance plasma chemical vapor deposition (ECR-PCVD) method. Reaction gases are mixed carbon-containing compound gas and hydrogen. Examples of the carbon-containing compound gas include hydrocarbon compounds such as methane, ethane and acetylene; oxygen-containing hydrocarbon compounds such as methanol and ethanol; aromatic hydrocarbons such as benzene and toluene; carbon dioxide; and mixtures thereof. By selecting appropriately conditions such as the blend ratio between the reaction gases, the pressure of the gases and a substrate bias voltage, a carbon thin body composed of an approximately netlike wall can be formed within the temperature range of 400 to 700° C. This process for producing a carbon thin body composed of an approximately netlike wall, according to the present invention, does not require the following material, device and condition, which are necessary for the production of conventional perpendicularly-oriented carbon nanotubes: (a) superfine particles made of Fe, Ni or the like, which are catalysts; (b) an electric field applying type plasma CVD device for exclusive use; and (C) a substrate temperature over 700° C.

In the carbon thin body producing process according to the second embodiment of the present invention, no catalysts are necessary and a widely-used ECR-PCVD device is used. Moreover, a substrate temperature of 600° C. or lower can be adopted. Therefore, an inexpensive glass substrate is used to make it possible to grow the approximately netlike wall carbon thin body.

Figure 5:
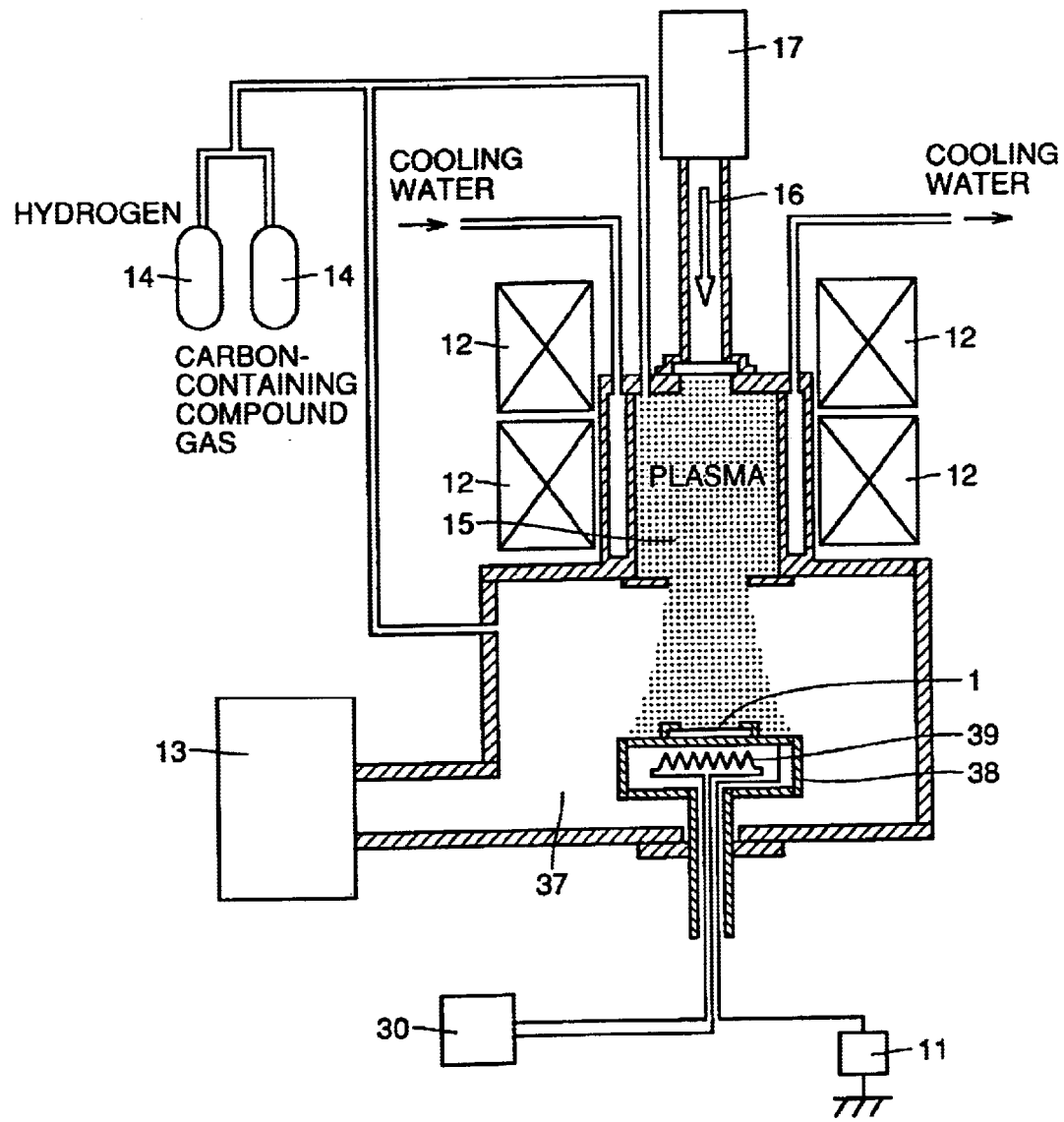
FIG. 5 is a schematic view of an electron cyclotron resonance plasma CVD device used for producing a carbon thin body composed of an approximately netlike wall.

Referring to FIG. 5, in this ECR-PCVD device, a substrate holder 38 is set up inside a vacuum chamber 37 and a substrate 1 is put on this substrate holder 38. Inside the substrate holder 38, a heater 39 for heating the substrate is arranged. The substrate 1 can be heated with a power source 30 for the heater. A bias voltage having an arbitrarily-selected value can be applied to the substrate 1 with a substrate bias power source 11. The substrate holder 38 can be moved, and has a mechanism making it possible to change the distance from the center of the magnetic field generated by an electromagnet 12 to the substrate 1.

A reaction gas source 14, an evacuation device 13, and a plasma generating chamber 15 are connected to the vacuum chamber 37. Furthermore, a microwave generating device 17 is connected to the plasma generating chamber 15. By a microwave 16 generated from the microwave generating device 17 and a magnetic field from the electromagnet 12, electron cyclotron resonance plasma is generated inside the plasma generating chamber 15. The resonance condition for electrons can be represented by $\omega=(e \cdot B)/m_e$ wherein $\omega$ is the frequency of the electromagnetic wave, B is the magnetic flux density of the magnetic field, e is the electric charge of an electron, and $m_e$ is the mass of the electron. However, the magnetic flux density of the magnetic field is locally uneven. Therefore, even if the frequency of the above-mentioned electromagnetic wave is shifted, the resonance condition for electrons is satisfied at some position. Thus, the above-mentioned carbon thin body of the present invention can be formed. For this reason, if the resonance condition for electrons is satisfied in some position in plasma, the process under this condition comes under the present invention. By introducing this electron cyclotron resonance plasma onto the substrate 1 inside the vacuum chamber, the carbon thin body of the invention can be formed on the substrate 1.

Structures such as the interval between the walls of the carbon thin body formed on the substrate and the thickness of the wall can be controlled by changing thin body-depositing conditions such as a substrate temperature, a substrate bias voltage and a reaction gas ratio, which are other control factors. Examples described below, described are examples wherein approximately netlike wall carbon thin bodies having different intervals between the walls were formed by changing thin body-depositing conditions. Since walls are complicated into an approximately netlike form in actual carbon thin bodies, the interval between the walls cannot be strictly measured. Therefore, the surface (tip portion) of the above-mentioned carbon thin body was observed with an SEM, and the number of openings approximately surrounded by the approximately netlike walls and present in a 3 μm square in the surface was counted. As the number of the openings is larger, the interval between the walls is narrower.

In Examples 1–4 described below, methane was used as a carbon-containing compound. However, even if any one of other compounds may be used, the carbon thin body of the invention can be formed. The scope of conditions for producing this carbon thin body varies dependently on the kind of the carbon-containing compound. Accordingly, conditions for producing the carbon thin body are different between the case that methane is used to produce carbon thin body and the case that any one of other carbon-containing compounds is used.

EXAMPLE 1

In Example 1, substrates were set at a position 395 mm apart from the center of a magnetic field, and the ratio between methane gas and hydrogen gas, which were reaction gases, was set to 1:2. Carbon thin bodies were deposited under the following conditions: total gas pressure: $5 \times 10^{-4}$ Torr, substrate bias voltage: 0 V, microwave power: 1 kW, and deposition time: 2 hours.

Figure 6:
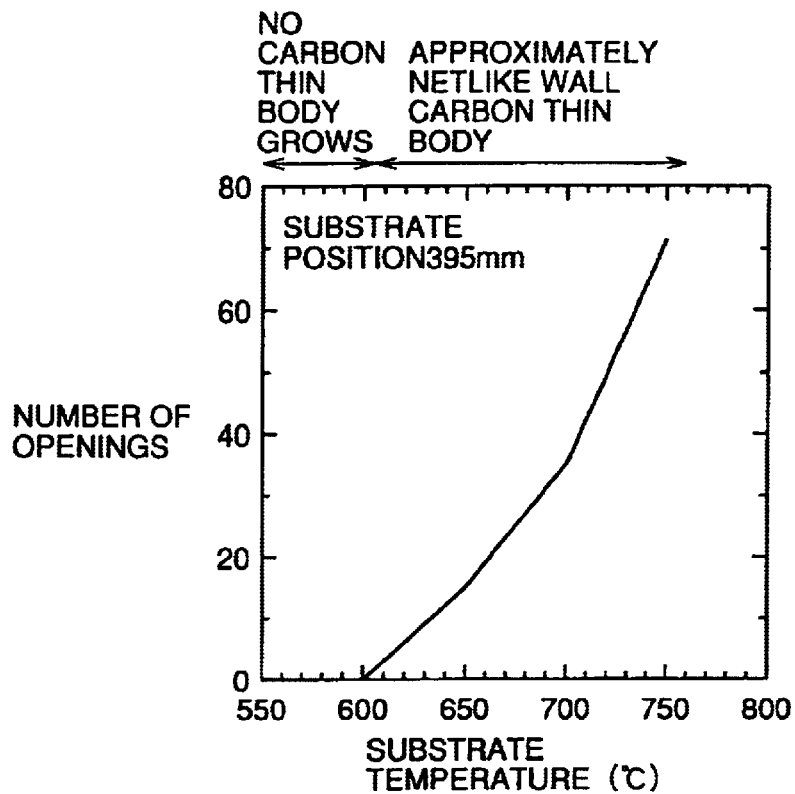
FIG. 6 is a graph showing a relationship between substrate temperature and the number of openings in the front surface of a carbon thin body composed of an approximately netlike wall (substrate position: 395 mm from the center of a magnetic field)

FIG. 6 demonstrates that in the case that the substrate temperature is below 600° C., neither carbon thin body of the invention nor carbon-containing thin layer is formed. At substrate temperatures of 600° C. or higher, a carbon thin body of the invention is formed and the number of its openings increases with a rise in the substrate temperature, so that interval between its walls becomes shorter.

EXAMPLE 2

Figure 7:
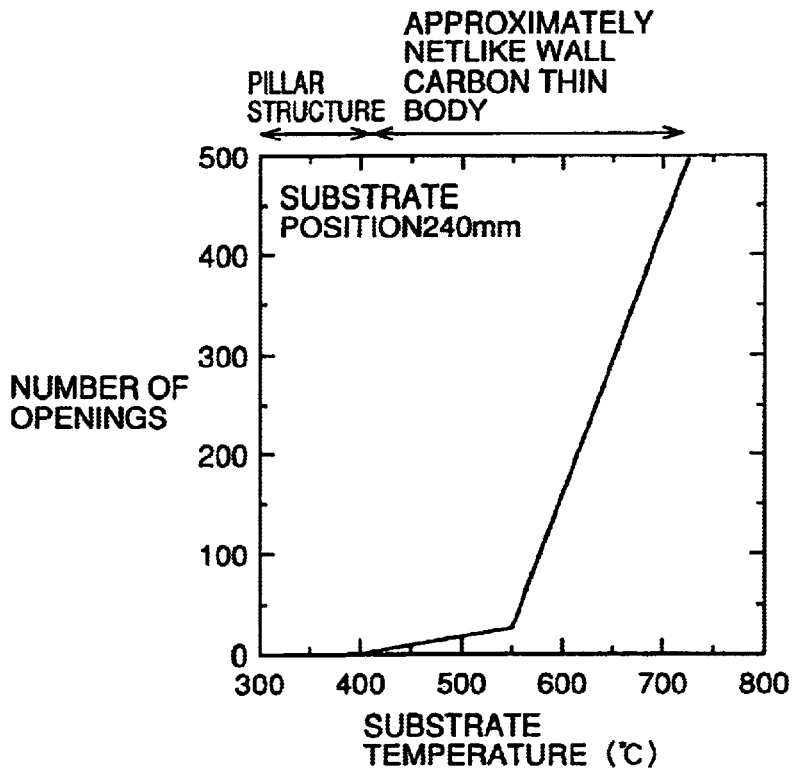
FIG. 7 is a graph showing a relationship between substrate temperature and the number of openings in the front surface of a carbon thin body composed of an approximately netlike wall (substrate position: 240 mm from the center of a magnetic field)

In Example 2 of the present invention, substrates were set at a position 240 mm apart from the center of a magnetic field, and carbon thin bodies were deposited under the same conditions as in Example 1. That is, the conditions were as follows: the ratio between methane gas and hydrogen gas, which were reaction gases: 1:2, total gas pressure: $5 \times 10^{-4}$ Torr, substrate bias voltage: 0 V, microwave power: 1 kW, and deposition time: 2 hours. FIG. 7 is a graph showing dependency of the number of openings in the carbon thin body of Example 2 upon the substrate temperature.

FIG. 7 demonstrates that in the case that the substrate temperature is below 400° C., no carbon thin body of the invention is formed and a structure similar to perpendicularly-oriented carbon nanotubes having a diameter of about 100 nm is formed. At substrate temperatures of 400° C. or higher, a carbon thin body of the invention is formed and the number of its openings increases with a rise in the substrate temperature, so that interval between its approximately netlike walls becomes shorter. From comparison of Example 1 with Example 2, it can be understood that by changing the distance between the substrate and the center of the magnetic field and adjusting the distance, the substrate temperature at which the carbon thin body of the invention is formed can be lowered. Therefore, it is possible to adopt a substrate temperature of 600° C. or lower, at which a more inexpensive glass substrate can be used.

Figure 8:
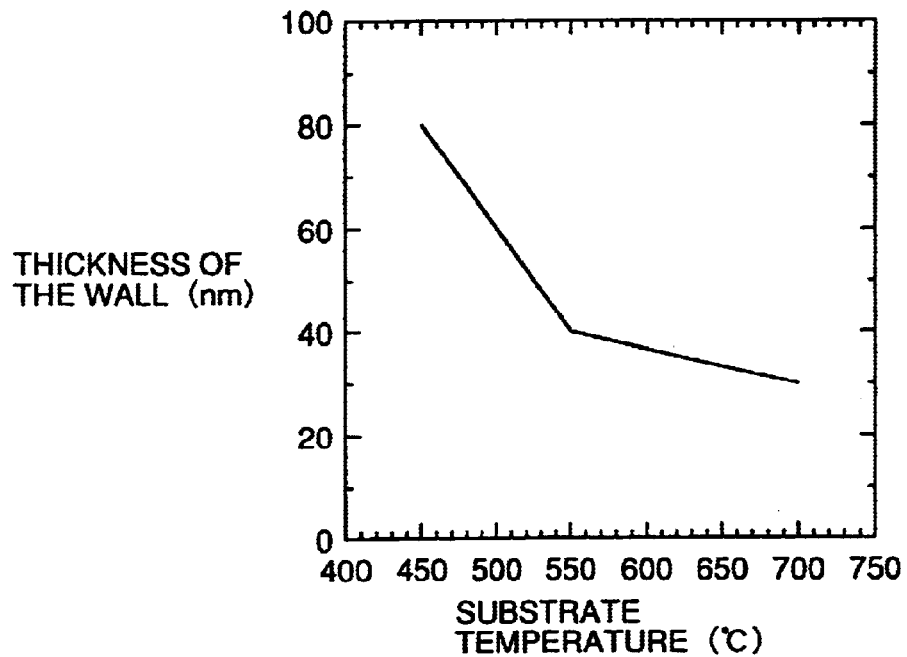
FIG. 8 is a graph showing a relationship between substrate temperature and the wall thickness of a carbon thin body composed of an approximately netlike wall (substrate position: 240 mm from the center of a magnetic field)

FIG. 8 demonstrates that as the substrate temperature becomes higher, the thickness of the walls becomes thinner. FIGS. 7 and 8 demonstrate that as the interval between the walls becomes shorter, the thickness of the walls becomes thinner. This characteristic about the form of the carbon thin body of the invention is exhibited even if the condition for producing it is changed.

EXAMPLE 3

In Example 3, substrates were set at a position 395 mm apart from the center of a magnetic field, and the ratio between methane gas and hydrogen gas, which were reaction gases, was set to 1:2. While a substrate bias voltage was changed, carbon thin bodies were deposited under the following conditions: total gas pressure: $5 \times 10^{-4}$ Torr, substrate temperature: 700° C., microwave power: 1 kW, and deposition time: 2 hours.

Figure 9:
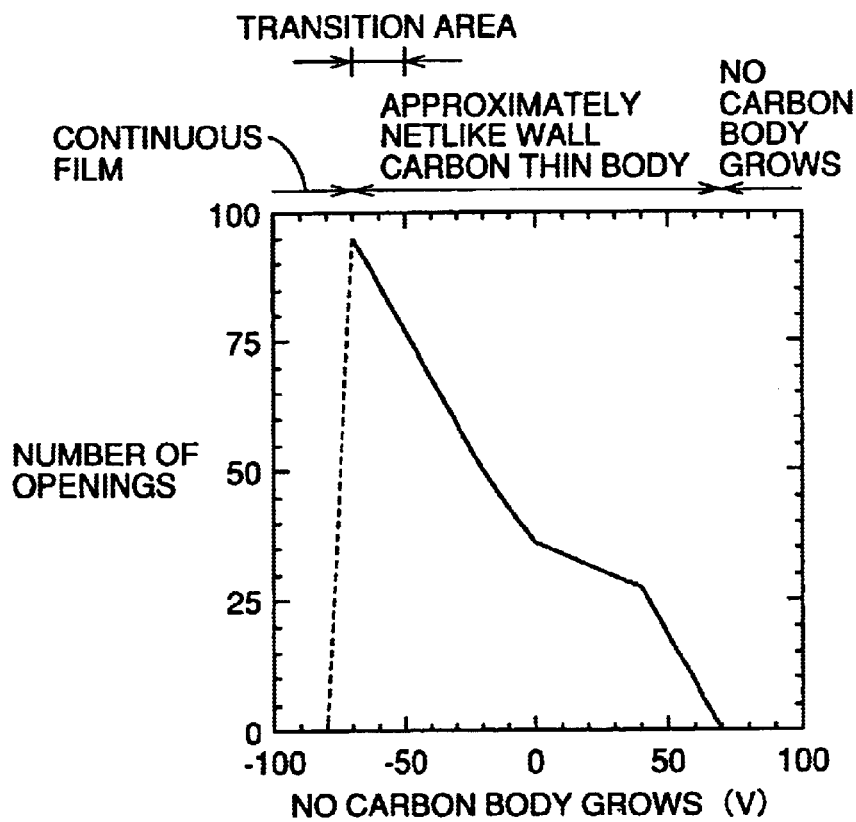
FIG. 9 is a graph between substrate bias voltage and the number of openings in the front surface of a carbon thin body composed of an approximately netlike wall.
Figure 10:
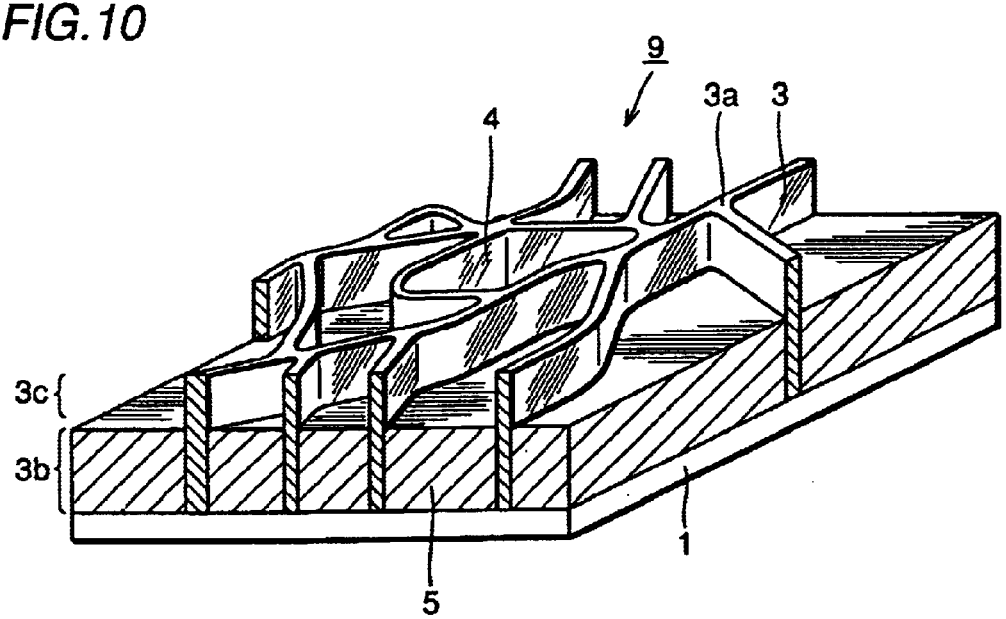
FIG. 10 is a schematic perspective view of a carbon thin body composed of an approximately netlike wall and having a continuous film form portion as its base.

FIG. 9 demonstrates that at substrate bias voltages below −70 V, no carbon thin body of the invention is formed and a carbon-containing, flat, continuous film is formed. Within the range of substrate bias voltages of −70 to −50 V, a transition-state film, in which a carbon thin body of the invention and a continuous film are mixed, is generated. As shown in FIG. 10, in this film, a continuous portion 5 is formed in a base 3b in the state that the portion is embedded in openings 4. Of course, the carbon thin body having a form as shown in FIG. 10 is included in the scope of the present invention. At substrate bias voltages of −50 to +70 V, a carbon thin body of the invention is formed. Moreover, as the substrate bias voltage becomes larger, the number of the openings 4 becomes smaller and the interval between the walls becomes wider. At substrate bias voltages over +70 V, no product is formed on the substrate.

EXAMPLE 4

In Example 4, substrates were set at a position 395 mm apart from the center of a magnetic field. While the ratio of hydrogen gas in reaction gases was changed, carbon thin bodies were deposited under the following conditions: total gas pressure: a level of $10^{-4}$ Torr, substrate temperature: 700° C., substrate bias voltage: 0 V, microwave power: 1 kW, and deposition time: 2 hours.

Figure 11:
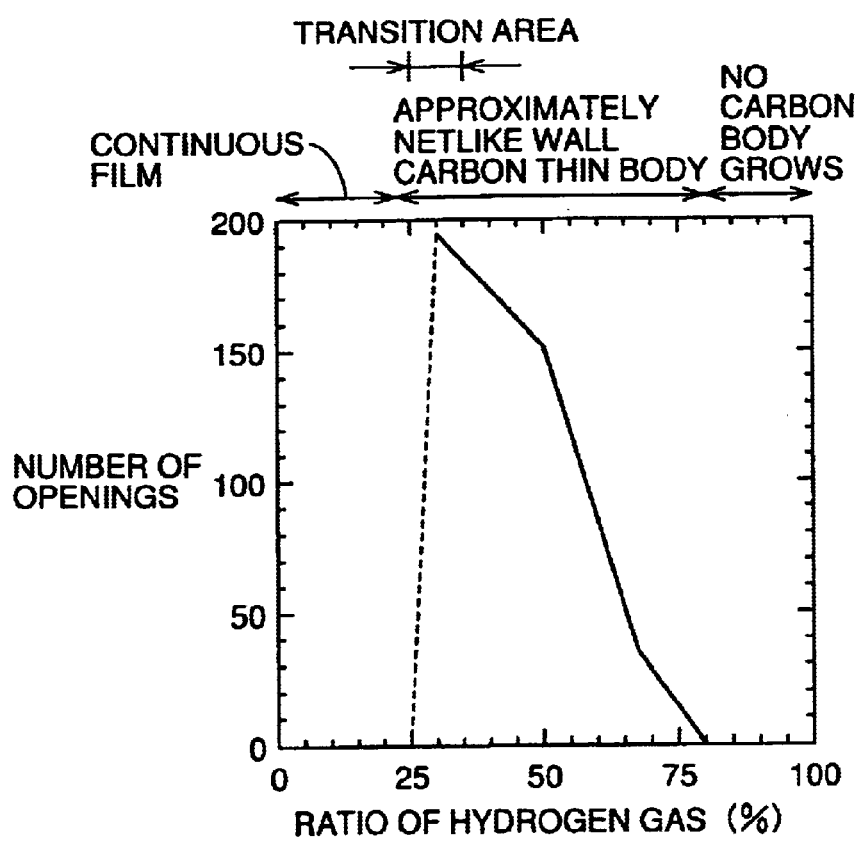
FIG. 11 is a view showing a relationship between the ratio of hydrogen gas in reaction gases and the number of openings in the front surface of a carbon thin body composed of an approximately netlike wall.

FIG. 11 demonstrates that within the range that the ratio of hydrogen gas is below 25%, no carbon thin body of the invention is formed and a carbon-containing, flat, continuous film is formed. Within the range that the ratio of hydrogen gas is from 25 to 35%, a transition-state film in which a carbon thin body of the invention and a continuous film are mixed is formed, as shown in FIG. 10. Within the range that the ratio of hydrogen gas is from 35 to 80%, a carbon thin body of the invention is formed. Moreover, as the ratio of hydrogen gas becomes larger, the number of openings becomes smaller and the interval between the walls becomes wider. Within the range that the ratio of hydrogen gas is over 80%, no product is formed on the substrate.

[Third Embodiment: Electric Field Emission Type Electron Source]

The third embodiment of the present invention will describe an example wherein the above-mentioned carbon thin body composed of an approximately netlike wall is used as a microscopic electric field emission type electron source. As a microscopic electric field emission type electron source, a Spindt type electron source, such as Mo or Si, has been hitherto used. In recent years, there have been developed carbon-type electric field emission type electron sources, which are expected to be operated at a low voltage and emit a stable electric current. Among the carbon-type microscopic electric field emission type electron sources, perpendicularly-oriented carbon nanotubes are expected to be operated at a low voltage since the curvature radius of the tips of the carbon nanotubes is very small. It is however very difficult to control the density of the perpendicularly-oriented carbon nanotubes. In order to form the perpendicularly-oriented carbon nanotubes, superfine metal particles made of Fe, Ni or the like, which becomes catalysts, are in general necessary. The density of the perpendicularly-oriented carbon nanotubes is decided by the state that the superfine metal particles are dispersed. However, it is very difficult to disperse the superfine metal particles in the state that the dispersion is sufficiently controlled.

Figure 12:
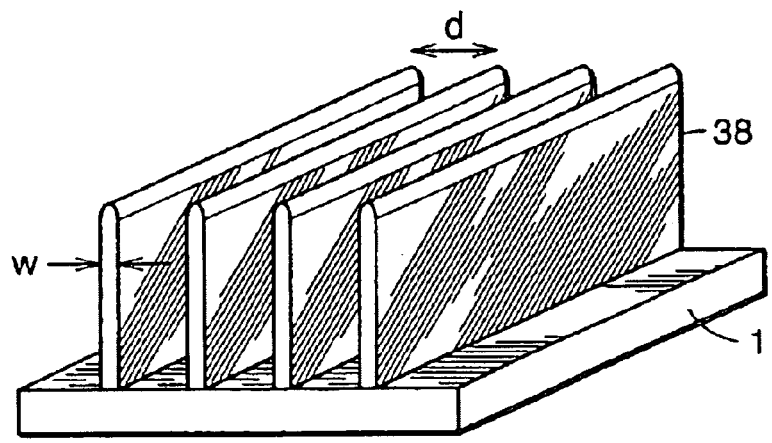
FIG. 12 is a perspective view of a model of a carbon thin body composed of an approximately netlike wall, the model being used for simulation of its electric field amplification factor and emission current.
Figure 26:
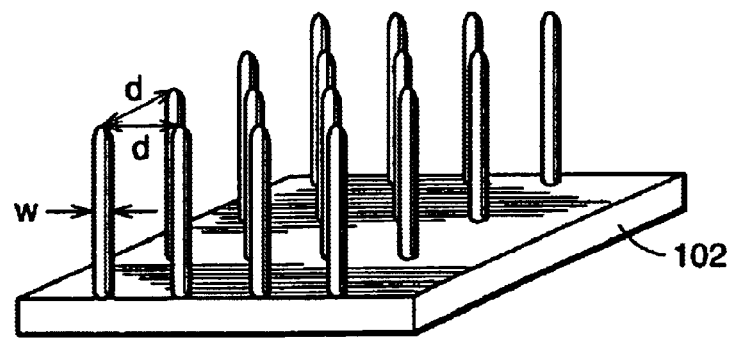
FIG. 26 is a perspective view of a model of perpendicularly-oriented carbon nanotubes used for simulation of their electric field amplification factor and emission current.

On the other hand, about the carbon thin body of the invention, the interval between the walls and the thickness of the walls can be sufficiently controlled and changed dependently on conditions for depositing the thin body as shown in the above FIGS. 1 to 4. In order to demonstrate advantages produced in the case that the carbon thin body of the invention is used as an electric field emission type electron source, simulation for obtaining an electric field amplification factor was carried out. FIG. 12 is a perspective view showing a model that the carbon thin body of the invention is simplified. Plate-like walls $3s$ having a thickness w are arranged in parallel and at intervals of a distance d. On the other hand, conventional perpendicularly-oriented carbon nanotubes are simplified by a simulation model wherein tubes having a tube diameter of w are regularly arranged at intervals of a distance d (see FIG. 26).

Figure 13:
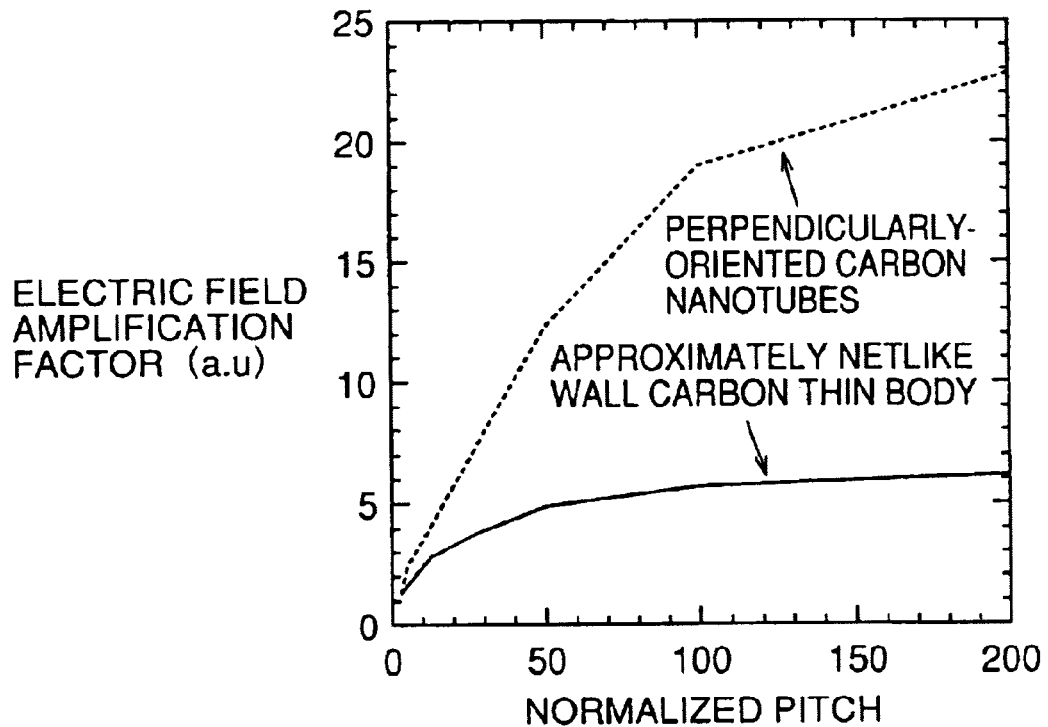
FIG. 13 is a graph showing simulation results of the electric field amplification factor of a carbon thin body composed of an approximately netlike wall (and showing simulation results of the electric field amplification factor of perpendicular carbon nanotubes as Comparative Examples)

In any electric field emission type electron source, electrons are pulled out from the tips of the electron source by the electric field near the tips. Through an applied external electric field, the electric field near the tip is amplified by a value multiplied by an amplification factor decided by the shape and arrangement of the tips of the electron source, and so on. As the tips of the electron source are sharper to make their curvature radius smaller and further the density of the sharp tips is smaller, the amplification factor in the tips of the electron source is larger. FIG. 13 is a graph showing relationships between: the normalized pitch of perpendicularly-oriented carbon nanotubes and the approximately netlike wall carbon thin body; and their electric field amplification factor. This normalized pitch is a value obtained by normalizing (dividing) the interval d between the carbon nanotubes or the approximately netlike walls by the diameter of the tubes or the thickness of the walls. The following can be understood from FIG. 13: (a) the electric field amplification factor of the perpendicularly-oriented carbon nanotubes is larger than that of the carbon thin body; (b) In the two, their electric field amplification factor increases monotonously as their pitch becomes larger; and (c) the rate of the increase (gradient) is larger in the perpendicularly-oriented carbon nanotubes.

The reason for the item (a) is that while the tips of the carbon nanotubes are very small points, the tips of the approximately netlike walls are linear in the carbon thin body of the invention. Therefore, the electron emission amount, per unit area, from the tips of the electron source is larger in the carbon nanotubes, the electric field amplification factor of which is larger. On the other hand, the current emitted from the electron source is decided by the product of the electron emission amount, per unit area, from the tips and the total area of the tips.

Figure 14:
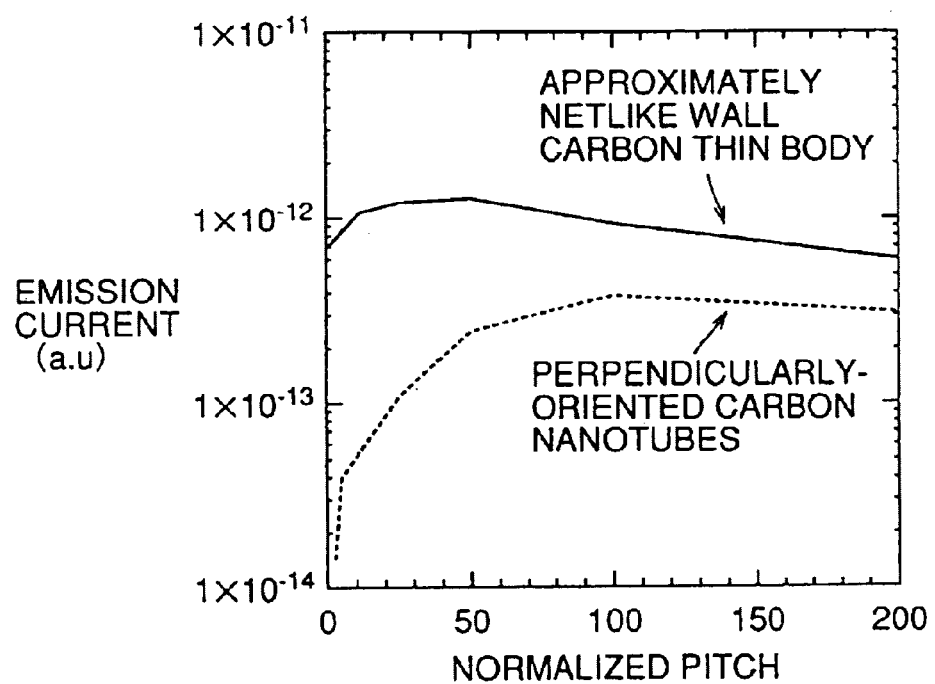
FIG. 14 is a graph showing simulation results of the emission current of a carbon thin body composed of an approximately netlike wall (and showing simulation results of the emission current of perpendicular carbon nanotubes as Comparative Examples))

Referring to FIG. 14, the following (a)–(c) can be understood: (a) The emission current increases until the normalized pitch becomes 100 in the perpendicularly-oriented carbon nanotubes, and the emission current increases until the pitch becomes 50 in the carbon thin body of the invention. Within these ranges, the electric field amplification factor in the tips increases as described above, as the pitch thereof becomes larger as shown in FIG. 13. Thus, the emission current increases. (b) As the pitch becomes larger, the emission current decreases. This is based on the fact that as the pitch becomes larger, the ratio of the area of the tips in the unit area decreases. In other words, this is because the rate of the decrease in the area of the electron emitting portion surpasses the rate of the increase in the electric field amplification factor in the tips. (c) Within the range of all the pitches, the emission current from carbon thin body of the invention is larger than that from the perpendicularly-oriented carbon nanotubes. This is based on the fact that the electric field amplification factor is smaller in the carbon thin body of the invention but the total electron emitting area is larger in the carbon thin body whose emitting portions are linear than in the carbon nanotubes whose emitting portions are in the form of points.

As described above, in the carbon thin body of the invention, the control of its shape is easier. In the case that the carbon thin body is used as an electric field emission type electron source, many electric currents can be obtained. The following will describe specific Examples 5 to 9 of the third embodiment, that is, production of electric field emission type electron sources, using a carbon thin body having an approximately netlike wall.

EXAMPLE 5

Figure 15:
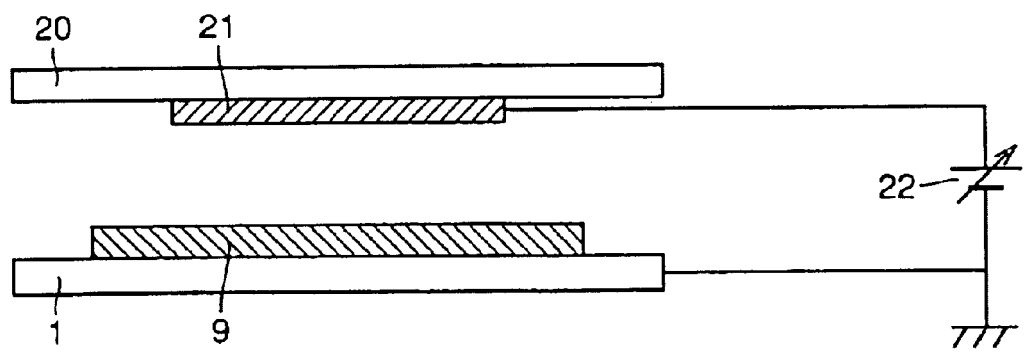
FIG. 15 is a schematic view of an emission current measuring device having a diode structure.
Figure 16:
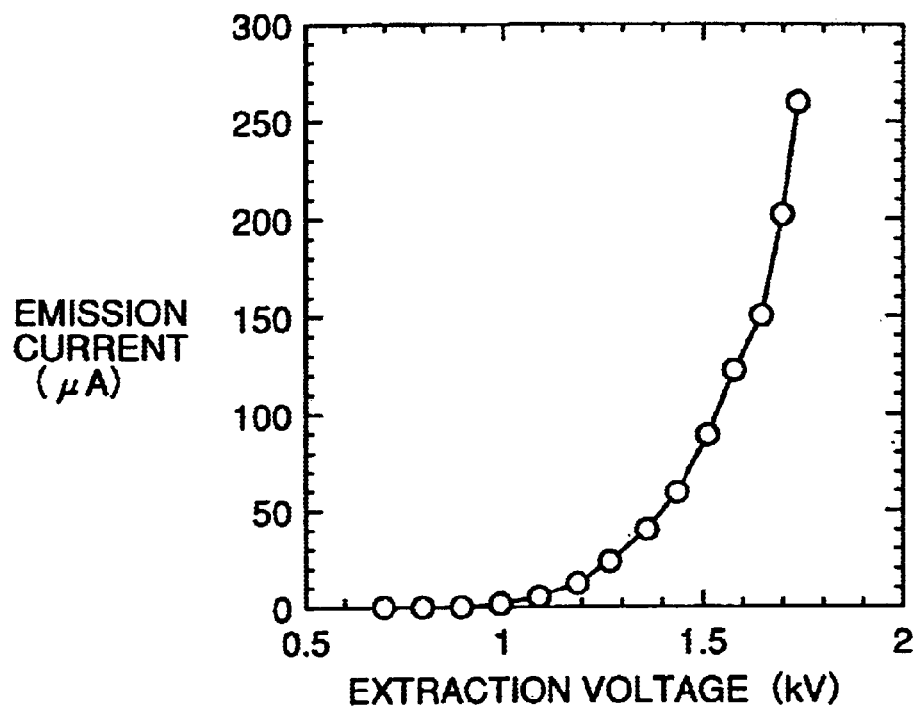
FIG. 16 is a graph showing a relationship between the emission current and the extraction voltage of a carbon thin body composed of an approximately netlike wall.

FIG. 15 is a schematic view of an emission current measuring device having a diode structure in Example 5 of the present invention. A carbon thin body composed of an approximately netlike wall in this device is as follows. An n type silicon wafer (specific resistivity: 0.03 Ωcm) was used as a substrate 1. This substrate 1 was set at a position 395 mm apart from the center of a magnetic field. By ECR plasma CVD method, the carbon thin body 9 was formed under the following conditions: ratio between methane gas and hydrogen gas, which were reaction gases: 1:2, total gas pressure: $5 \times 10^{-4}$ Torr, substrate temperature: 700° C., microwave power: 1 kW, substrate bias voltage: 0 V and deposition time: 2 hours. This carbon thin body 9 was used as an electron emitting source, to produce the diode structure shown in FIG. 15. The distance between a silicon wafer 1 on which the carbon thin body 9 was formed and a glass substrate 20 on which an opposite electrode 21 was formed was 150 $\mu$m. An ITO (indium tin oxide) film 21, functioning as both a extraction electrode an anode electrode for capturing emitted electrons, was formed on the glass substrate 20. FIG. 16 is a graph showing results obtained by measuring the emission current while changing extraction voltage in this diode structure.

FIG. 16 demonstrates that when the voltage is applied to the ITO film by a direct current power source, electrons are first emitted from the carbon thin body at a voltage of about 0.8 kV. With an increase in the extraction voltage, the emission current increases abruptly. When the extraction voltage is about 1.7 kV, an emission current over 250 $\mu$A can be obtained. This voltage-current characteristic (VI characteristic) is subjected to FN (Fowler-Nordheim) plotting, so that the plotted results are linear. This demonstrates that electron emission from the carbon thin body is an electric field emission.

EXAMPLE 6

In any electric field emission type electron source, it is desired that a voltage for extracting electrons is lower. For this purpose, it is desired that the source has a structure wherein a extraction electrode for extracting electrons and an anode electrode for capturing the electrons are separated and the extraction electrode is made closer to an electron emitting portion (cathode). In the case of this structure, the electron source has a two-electrode structure having the cathode electrode and the extraction electrode.

Figure 17:
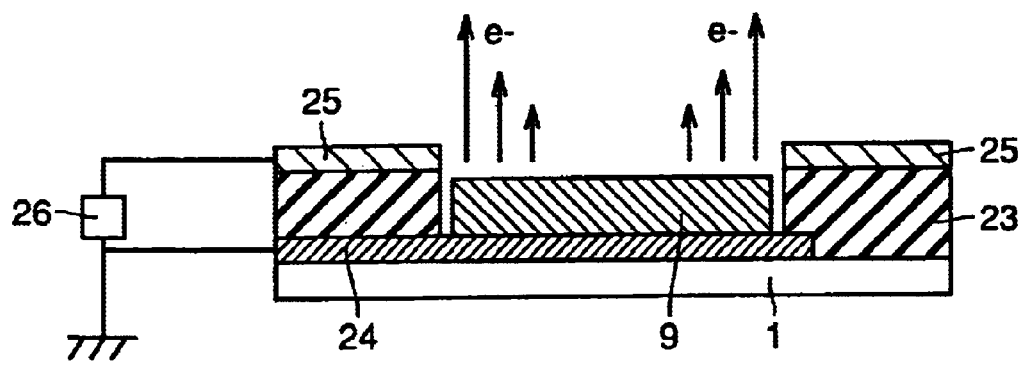
FIG. 17 is a sectional view of a first example of an electric field emission type electron source using a carbon thin body composed of an approximately netlike wall, the source being an embodiment of the present invention.
Figure 18:
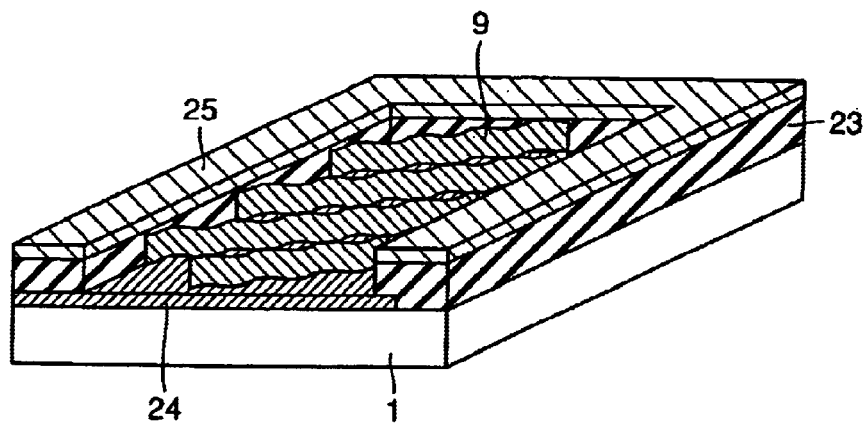
FIG. 18 is a perspective view of a partial section of the carbon thin body shown in FIG. 17.

Referring to FIGS. 17 and 18, a cathode pulling-out electrode 24 is formed on a substrate 1. The electrode 24 is an electrode for supplying electrons to a carbon thin body 9 composed of a approximately netlike wall, which is an electron emitting portion (cathode). The carbon thin body 9 is formed on a part of the cathode pulling-out electrode 24. Furthermore, an insulating film 23 is formed on the cathode pulling-out electrode and on a part of the substrate, the part being inside an area wherein the cathode pulling-out electrode is not formed, so that the insulating surrounds the carbon thin body 9. A extraction electrode 25 is formed on this insulating film 23. In such a structure, an appropriate positive voltage is applied to the extraction electrode 25 by a power source 26 for the extraction electrode, so that an electric field is generated at the tip of the approximately netlike wall of the carbon thin body 9. Electrons are emitted from the tip. Since the emitted electrons are generated by the electric field generated by applying the positive voltage to the extraction electrode 25, the amount of the emitted electrons is larger at the tip of the approximately netlike wall, wherein the electric field is more intense. Namely, this amount is smaller as positions nearer to the center.

EXAMPLE 7

Figure 19:
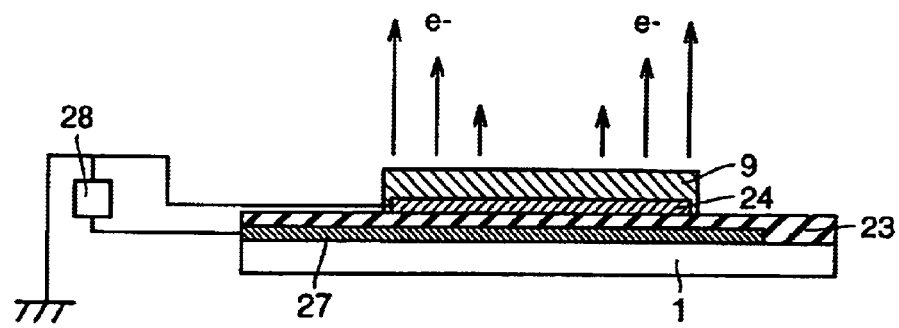
FIG. 19 is a sectional view of a second example of an electric field emission type electron source using a carbon thin body composed of an approximately netlike wall, the source being an embodiment of the present invention.
Figure 20:
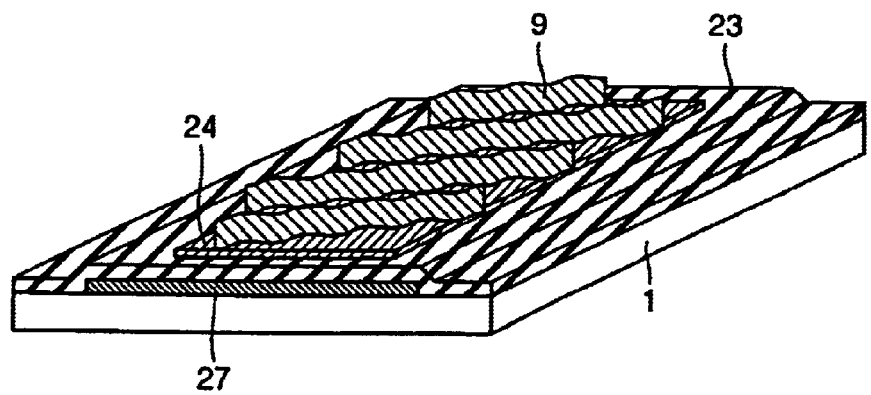
FIG. 20 is a perspective view of a partial section of the carbon thin body shown in FIG. 19.

Referring to FIGS. 19 and 20, a backside extraction electrode 27 is formed on a substrate 1. An insulating film 23 is formed to cover the electrode 27. A cathode pulling-out electrode 24 is deposited on the insulating film 23. The electrode 24 is an electrode for supplying electrons to a carbon thin body 9 composed of an approximately netlike wall, which is an electron emitting portion. In this structure, an appropriate positive voltage is applied to the backside extraction electrode 27 by a power source 28 for the extraction electrode, so that an electric field is generated, through the insulating film 23, at the tip of the approximately netlike wall of the carbon thin body 9. Electrons are emitted from the tip. The electron emission is caused by the electric field that the backside extraction electrode 27 having the positive voltage generates. This electric field is intense at the end of the cathode electrode, and is weaker as positions nearer to the center shielded by the cathode pulling-out electrode. Thus, in proportion to the intensity of the electric field, the amount of the emitted electrons is large at the end of the cathode and is smaller as positions nearer to the center.

EXAMPLE 8

Figure 21:
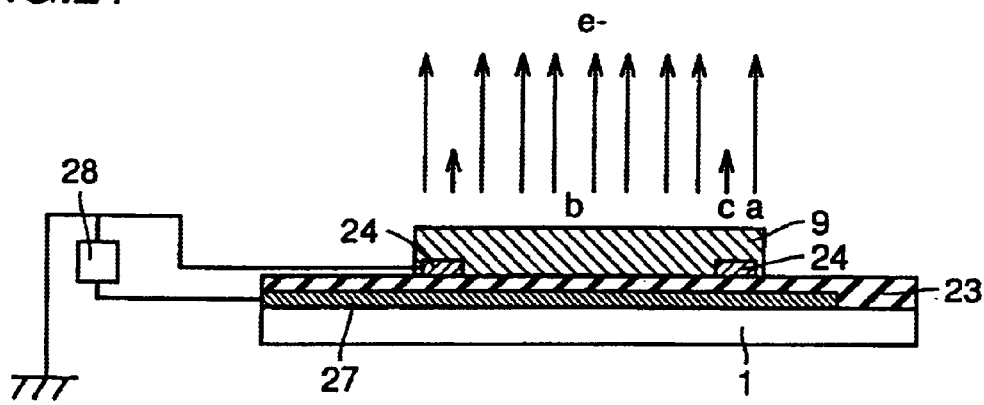
FIG. 21 is a sectional view of a third example of an electric field emission type electron source using a carbon thin body composed of an approximately netlike wall, the source being an embodiment of the present invention.
Figure 22:
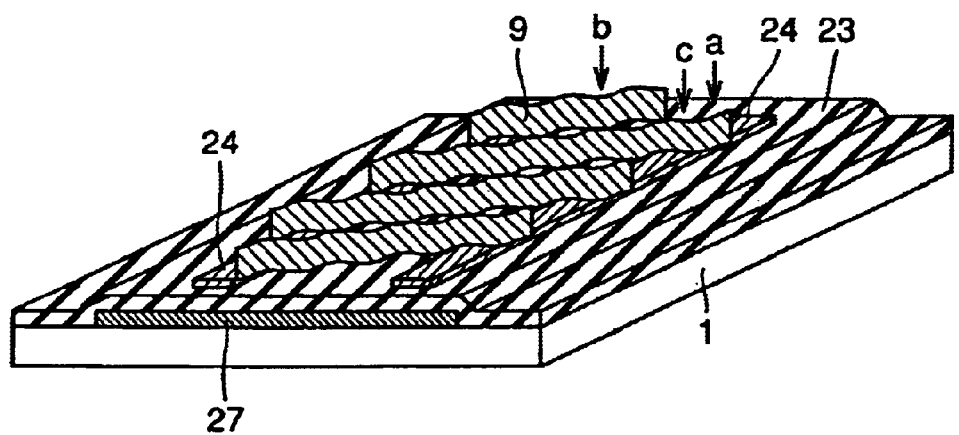
FIG. 22 is a perspective view of a partial section of the carbon thin body shown in FIG. 21.

Referring to FIGS. 21 and 22, in the above-mentioned two-electrode electron source, a backside extraction electrode 27 is formed on a substrate 1. An insulating film 23 is formed to cover the electrode 27. A carbon thin body 9 composed of an approximately netlike wall, which constitutes a cathode electrode, is formed on this insulating film. A cathode pulling-out electrode 24 is formed between a part of the carbon thin body and the insulating film. The electrode 24 is an electrode for supplying electrons to the carbon thin body. The electrode 24 is arranged through the insulating film 23 in the front of the backside extraction electrode 27.

In this structure, an appropriate positive electric potential is applied to the backside extraction electrode 27 by a power source 28 for the extraction electrode, so that an electric field is generated, through the insulating film 23, at the front side tip of the approximately netlike wall of the carbon thin body 9. Electrons are emitted from the tip by this electric field. In this structure, the electric field is shielded by the cathode pulling-out electrode 24 in an area c just under which the electrode 24 is present, in the same way as in Example 7. Therefore, the amount of emitted electrons in this area c is smaller than that in an end area a having no shield. In the case that the two-electrode structure electron source shown in FIG. 21 is compared with Example 7, the cathode pulling-out electrodes 24 are localized just under the areas c, and are not arranged in a center area of the cathode electrode. Therefore, in the center area b, an electric field having an intensity similar to that in the end areas a can be generated. The carbon thin body 9 has satisfactory conductivity. Thus, electrons are supplied from the cathode pulling-out electrode 24 to the center area of the cathode even if no cathode pulling-out electrode 24 is present just under this center area. For this reason, in the center area b of the cathode electrode, electrons can be emitted to the same extent as in the end area a. Thus, as is compared with the two-electrode structure electron source of Example 7, the electron source of the present Example 8 makes it possible to increase the amount of emitted electrons from the whole of the electron source and improve the uniformity of electron emission.

EXAMPLE 9

Figure 23:
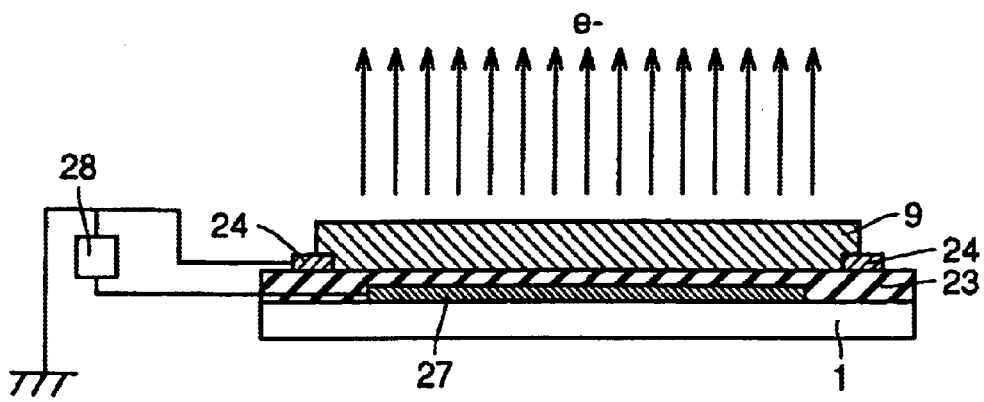
FIG. 23 is a sectional view of a fourth example of an electric field emission type electron source using a carbon thin body composed of an approximately netlike wall, the source being an embodiment of the present invention.
Figure 24:
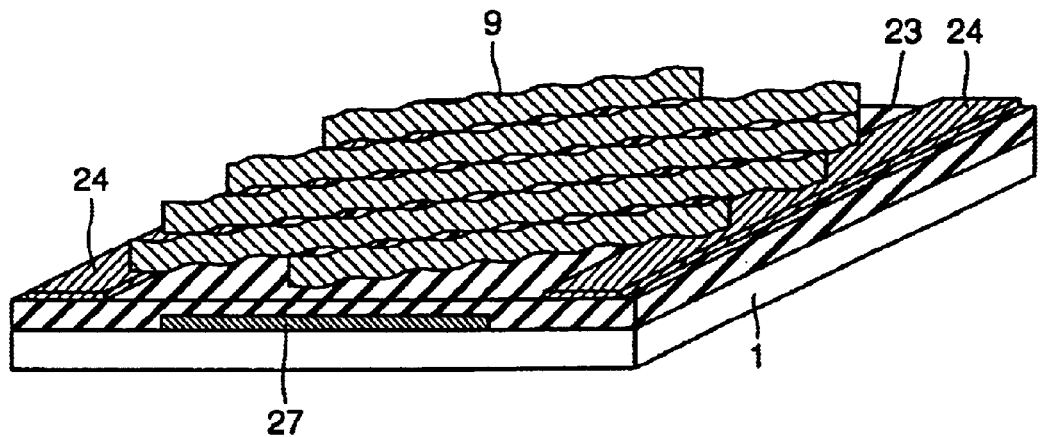
FIG. 24 is a perspective view of a partial section of the carbon thin body shown in FIG. 23.
Figure 25:
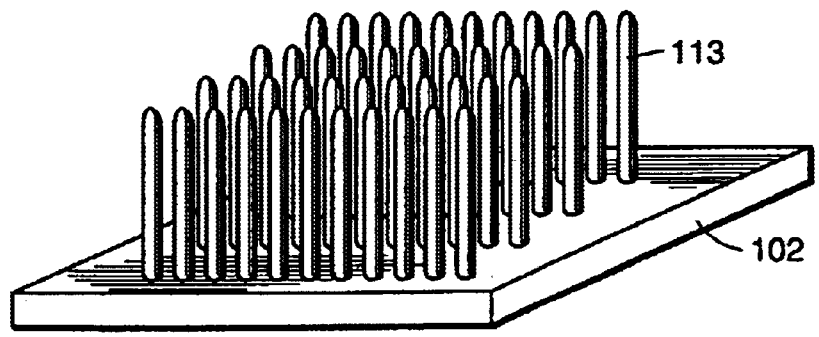
FIG. 25 is a schematic perspective view of conventional perpendicularly-oriented carbon nanotubes.

Referring to FIGS. 23 and 24, in a two-electrode electron source of the present Example 9, a backside extraction electrode 27 is formed on a substrate 1. An insulating film 23 is formed to cover the electrode 27. A carbon thin body 9 composed of an approximately netlike wall, which constitutes a cathode electrode, is formed on this insulating film 23. A cathode pulling-out electrode 24 for supplying electrons to the carbon thin body 9 is formed between a part of the carbon thin body 9 and the insulating film 23. This electrode 24 is arranged not to overlap with the backside extraction electrode, as is viewed in plan.

In this structure, an appropriate positive voltage is applied to the backside extraction electrode 27 by a power source 28 for the backside extraction electrode, so that an electric field is generated, through the insulating film 23, near the front side tip of the approximately netlike wall of the carbon thin body 9. Electrons are emitted from the tip. In the present Example 9, no cathode pulling-out electrode 24 is arranged in the front of the backside extraction electrode 27, which is different from Examples 7 and 8. Accordingly, the electric field generated by applying the positive voltage, through the insulating film 23, to the backside extraction electrode 27 is not shielded. For this reason, the electric field is uniformly generated at the front side tip of the whole of the carbon thin body 9. Since electrons are supplied from the cathode pulling-out electrode 24 to the whole of the carbon thin body 9 in the same way as Example 8, electron emission is caused from areas just under which no cathode pulling-out electrode 24 is present.

As described above, according to the two-electrode structure electron source of the present Example 9, an electric field is uniformly generated at the front side tip of the whole of the carbon thin body 9 constituting the cathode electrode. Moreover, electrons are sufficiently supplied. In Example 9, therefore, the amount of emitted electrons becomes larger than that in the electron sources of Examples 7 and 8. The uniformity of electron emission is also improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A structure including a carbon body comprising:
    a substrate; and
    a body consisting essentially of carbon and disposed on the substrate, the body consisting essentially of carbon having a plurality of continuously connected intersecting walls transverse to the substrate.

2. The structure according to claim 1, wherein the continuously connected intersecting walls define perimeters of openings that are located between intersections of the continuously connected intersecting walls.

3. The structure according to claim 2 including a continuous film in the openings at the substrate.

4. The structure according to claim 2, wherein the openings are aligned along a common direction.

5. The structure according to claim 4, wherein the direction is transverse to the substrate.

6. The structure according to claim 1, wherein the body consisting essentially of carbon includes a hexagonal crystalline phase.

7. The structure according to claim 1, wherein the walls have an average thickness on the substrate not exceeding 100 nm.

8. The structure according to claim 1, wherein the walls are continuously connected electrically.

9. The structure according to claim 1, wherein the substrate is glass.

10. A process for producing a structure including a body of carbon, the process including:
    generating a plasma in a mixture of gases containing a gaseous carbon compound and hydrogen in a concentration range from 25% to 75%; and
    applying a magnetic field and microwaves to the plasma to establish a resonance condition for electrons in the plasma, wherein the magnetic field and the microwaves advance in a direction parallel to the magnetic field, crossing a surface of a substrate, producing a reaction in the gaseous carbon compound and forming a body of carbon on the surface of the substrate, the body of carbon having a plurality of continuously connected intersecting walls transverse to the surface of the substrate.

11. The process for producing the body of carbon according to claim 10, wherein the substrate is a glass substrate.

12. The process for producing the body of carbon according to claim 10, wherein the substrate is heated to no more than 700° C.

13. An electric field emission electron source including:
   a substrate; and
   a body consisting essentially of carbon and disposed on the substrate as an electron emitting member for emitting electrons, the body consisting essentially of carbon having a plurality of continuously connected intersecting walls transverse to the substrate.

14. The electric field emission electron source according to claim 13, wherein the continuously connected intersecting walls define perimeters of openings that are located between intersections of the continuously connected intersecting walls.

15. The electric field emission electron source according to claim 13, including a cathode electrode for supplying electrons to the body consisting essentially of carbon, and an extraction electrode for generating an electric field for inducing emission of electrons from the body consisting essentially of carbon, wherein the body consisting essentially of carbon is positioned opposite the cathode electrode, contacting the cathode electrode, and the extraction electrode is positioned surrounding the body consisting essentially of carbon without overlapping the body consisting essentially of carbon, when viewed in a direction transverse to the substrate.

16. The electric field emission electron source according to claim 13, including
   a cathode electrode for supplying electrons to the body consisting essentially of carbon, and
   a backside extraction electrode, positioned at a rear side of the body of carbon, for generating, from the rear side of the body consisting essentially of carbon, an electric field for inducing emission of electrons from a front side of the body consisting essentially of carbon, the front side of the body consisting essentially of carbon being opposite the rear side of the body consisting essentially of carbon, wherein
      the cathode electrode is positioned opposite the backside extraction electrode, and
      the body consisting essentially of carbon is positioned opposite the cathode electrode, contacting the cathode electrode.

17. The electric field emission electron source according to claim 16, wherein the cathode electrode is located only at a periphery of the body consisting essentially of carbon.

18. The electric field emission electron source according to claim 16, wherein the cathode electrode is positioned outside the backside extraction electrode and not overlapping the backside extraction electrode, when viewed in a direction perpendicular to the substrate.

* * * * *